Sheet 3. 3 Sheets.

M. S. Woodbury.
Dumping Wagon.
N° 86,619.   Patented Feb. 2, 1869.

Witnesses:

Inventor.
Mark S. Woodbury
by his Attorneys
Fischumacher & Stearns

MARK S. WOODBURY, OF BETHEL, VERMONT.

Letters Patent No. 86,619, dated February 2, 1869.

IMPROVED OX-CART.

The Schedule referred to in these Letters Patent and making part of the same.

*To all whom it may concern:*

Be it known that I, MARK S. WOODBURY, of Bethel, in the county of Windsor, and State of Vermont, have invented certain Improvements in Carts, of which the following is a full, clear, and exact description, reference being had to the accompanying drawings, making part of this specification, in which—

My invention particularly relates to that class of carts employed for various farming-purposes, and ordinarily termed "ox-carts."

As these carts are required to be used for drawing both heavy, compact materials, such as stones, dirt, &c., and also those which are light and bulky, such as hay, straw, &c., it has been customary to provide a short and a long body, and also a short and a long tongue-piece, or draught-pole, which may be attached to one and the same pair of wheels.

This construction is objectionable, for the reason of the expense incident thereto, and also because of the inconvenience and loss of time occasioned by the change of the respective parts.

To remove the above-mentioned objections is the purpose of my invention, which consists in a sliding frame in connection with an extension-top, rail, or "rave," the frame, when drawn out, serving to support the front or tail-board, in such manner as to extend the floor of the cart, the frame being held firmly together and in place by means of the extension-"rave;" and my invention also consists in a sliding tongue-piece, or draught-pole, which, when the body of the cart is to be extended, may be drawn out, so as to project a sufficient distance in front to allow the oxen to be hitched thereto.

To enable others skilled in the art to understand and use my invention, I will proceed to describe the manner in which I have carried it out.

Figure 1:
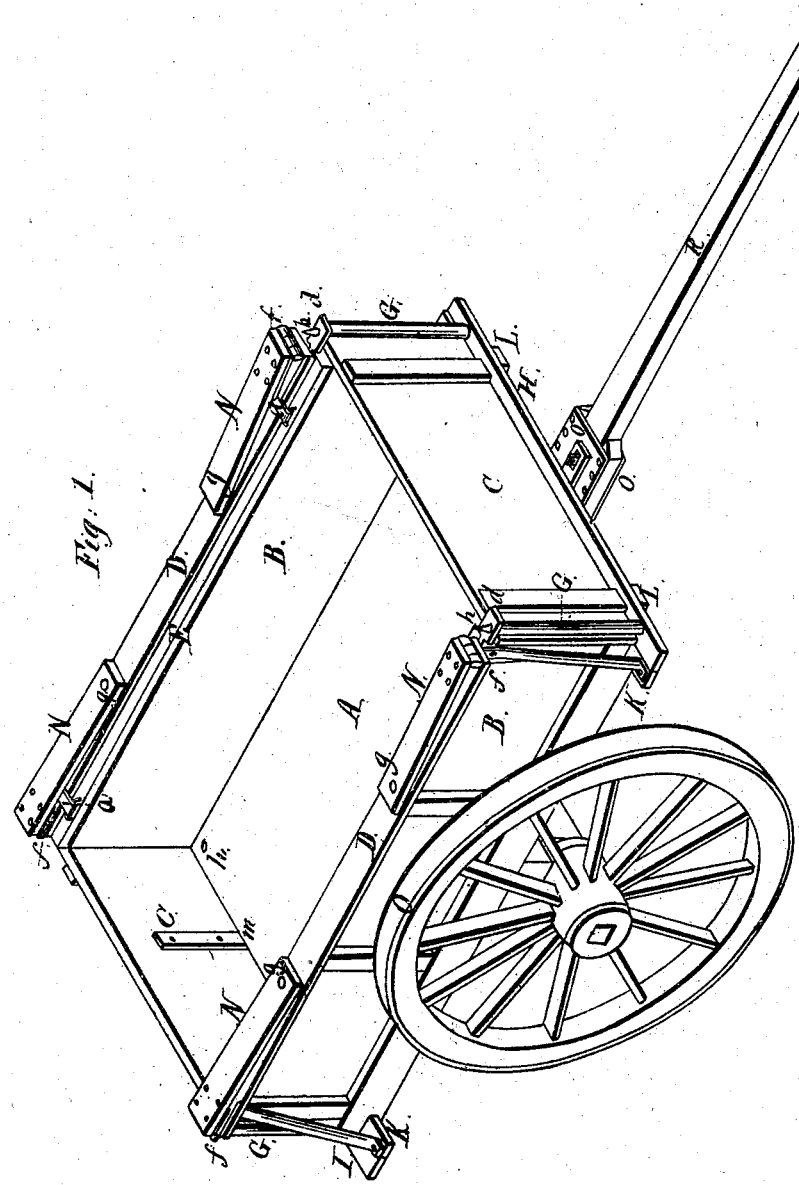
Figure 1 is a perspective view of an ox-cart with my improvements applied thereto.

In fig. 1, of the said drawings, the body of the cart is represented of the ordinary length required for drawing stones, dirt, or other heavy and compact material.

A is the floor;

B B, the two sides;

C C, the front and tail-boards respectively; and

D D, the side rails, or "raves," hinged, at *a*, to the longitudinal beams E E, forming the top of the body.

F F are the transverse top rails, at the front and rear ends of the cart, which fit over the upper ends of poles *b*, projecting up from the interior of hollow posts G, rising from supplementary cross-bars H I, extending transversely and immediately in front and behind the body of the cart, and contiguous to the ordinary front and rear cross-bars, K.

These supplementary cross-bars H I are secured, near each end, to the outer ends of longitudinal bars L, which are free to slide within guides *c*, attached to the under side of the bottom side rails M.

To each end of the longitudinal beams E E is pivoted an arm, *d*, the outer end of which is flattened horizontally, and is provided with a circular hole, to allow of its fitting snugly over the top of the hollow post G next it, when the arm is swung down, to hold the sliding bar L, with its front or tail-board C, in place.

To each end of the side rails, or "raves" D D is hinged, at *f*, an extension-rail or "rave," N, provided with a hole, *g*, at its outer end, for the purpose of fitting over the upper end of the pole *b*, next it, when the sliding frame is drawn out to increase the length of the body, when the cart is to be employed in transporting hay, straw, or other light products.

Figure 2:
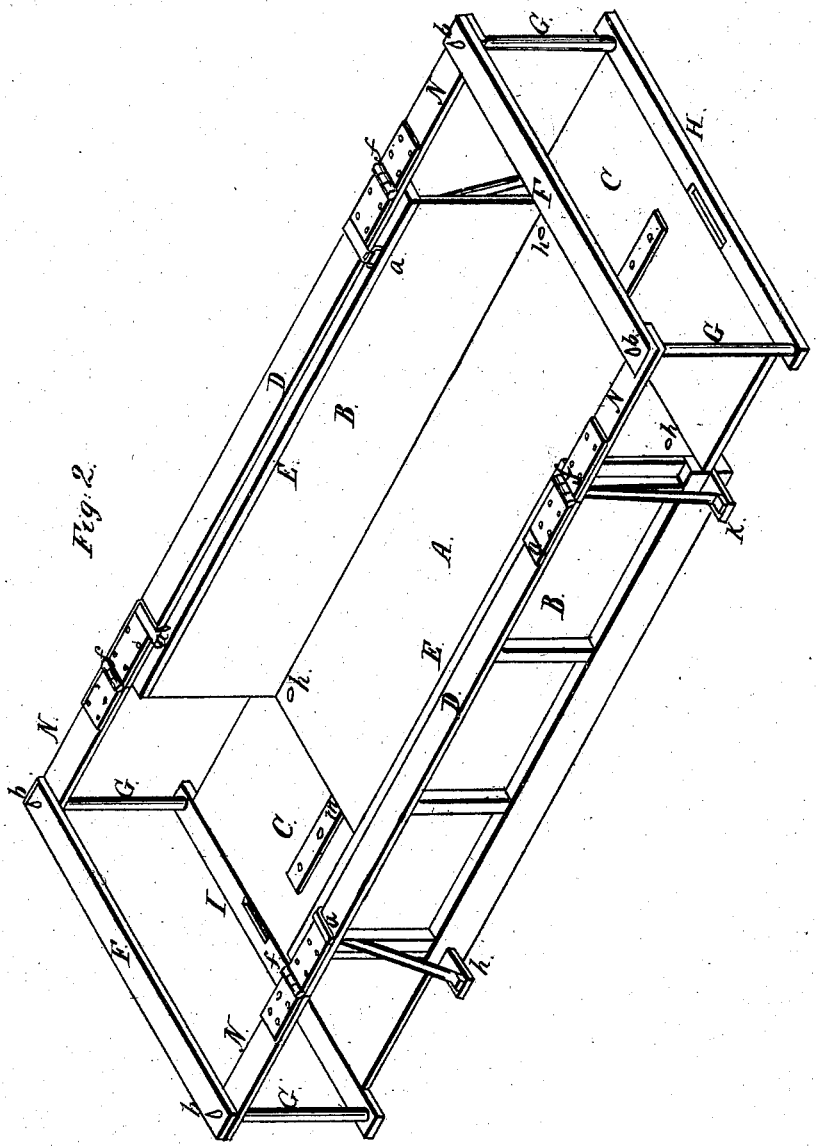
Figure 2 is a perspective view, representing the manner in which the body of the cart is extended.
Figure 3:
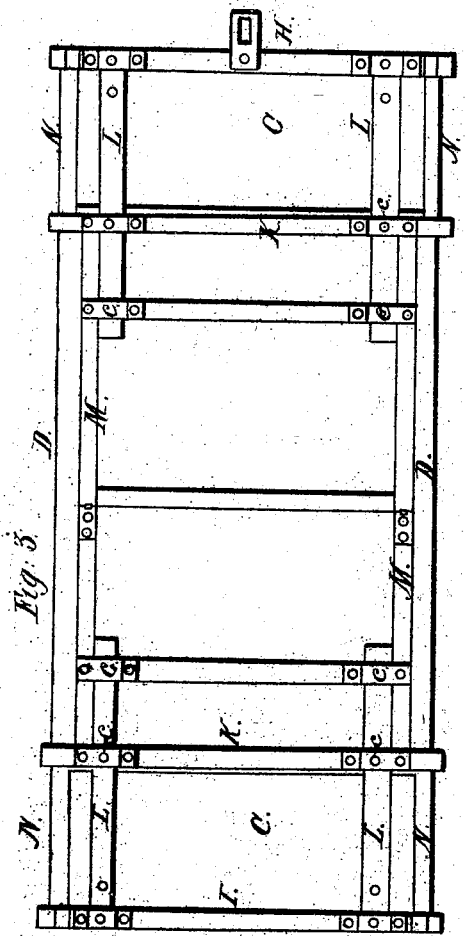
Figure 3 is a plan of the under side of the body of the cart when extended, the wheels and tongue being removed, to show more clearly my improvements.

I will now describe, by reference to fig. 2, how the body of the cart may be extended, in a convenient and expeditious manner.

*h* are pins, which pass through the floor of the cart into holes in the sliding frame beneath, to assist in holding it securely in place when drawn out thereunder. These pins are first removed, and the "raves" D D are inclined inward, to allow the arms *d*, at each corner of the body, to be thrown up out of connection with the tops of the hollow posts G, when the frames are free to be drawn out a distance equal to the height of the front or tail-board, the latter being then swung down, so as to rest upon the frame, and thus increase the length of the body.

In this position the extensions of the floor are secured, by dropping the pins *h* through their holes in the floor, and into holes in the sliding frame, and by turning back the raves D D, and throwing down the extension-raves N N, the hole *g*, in the end of each, being brought snugly over the upper ends of the poles *b*, at the four corners of the body.

The tail and front-boards are each connected, at *m*, with the body by hinges, so constructed as to allow of their removal when in a vertical position, but secures them in place, as desired, when in a horizontal position.

The extension of the body of the cart, above described, necessitates the lengthening of the tongue, or draught-pole, in order to furnish sufficient room to hitch the oxen thereto.

This is accomplished very readily as follows:

O O are a pair of wheels attached to the ends of an axle, over which, and secured thereto by straps *n*, is a transverse piece, P, into which are fastened the ends of two braces, Q Q, the opposite ends of which are united by plates *o o*, forming a guide, through which a tongue, or draught-pole, R, is free to slide, on the removal of a pin, *p*, passing through one of the holes *q r* in the said pole.

S is another guide, for steadying the pole, and for directing its end into the transverse piece P.

Figure 4:
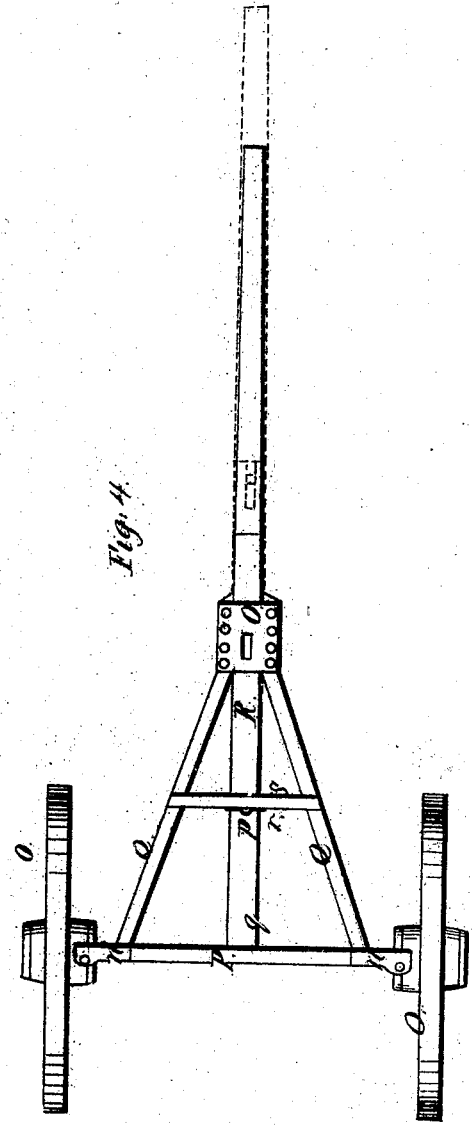
Figure 4 is a plan of the upper side of the axle and wheels, together with the tongue or draught-pole, the red lines representing it when drawn out.

The pole being in the position shown in black, fig. 4, the pin *p* is lifted out of its hole, and the pole drawn out until the hole *q* is brought in line with an aperture formed by a bent strap secured to the side of the guide S, when the pin is dropped thereinto, and the pole is secured, as required.

By the application of the foregoing improvements, I am enabled to provide, at a trifling expense, an ox-cart, which may be readily adapted to all of the requirements of a farm, thus avoiding the expense of an extra body and draught-pole, incident to the old method of construction.

*Claims.*

What I claim as my invention, and desire to secure by Letters Patent, is—

A sliding frame, with its posts G and extension-"raves" N N, connected with the body of the cart, substantially as and for the purpose described.

Also, in combination with the above, the draught-pole R, sliding between braces Q Q, when secured by the pin *p*, substantially as and for the purpose set forth.

MARK S. WOODBURY.

Witnesses:
JOHN W. HIBBARD,
JOHN E. ABBOTT.